Nov. 22, 1966 J. D. MALONE 3,287,699

RADIOTELEPHONE IDENTIFICATION SIGNAL APPARATUS

Filed May 13, 1963 2 Sheets-Sheet 1

INVENTOR.
James D. Malone
BY
Paul J. Ethington
ATTORNEY

INVENTOR.
James D. Malone
BY
Paul J. Ethington
ATTORNEY 3,287,699

RADIOTELEPHONE IDENTIFICATION SIGNAL APPARATUS

James D. Malone, San Mateo, Calif., assignor to General Motors Corporation, Detroit, Mich., a corporation of Delaware Filed May 13, 1963, Ser. No. 279,869
1 Claim. (Cl. 340—164)

This invention relates to selective signaling systems and more particularly to station identification apparatus to be used in combination with a mobile transmitter for transmitting a call signal prior to and at the completion of a message signal.

In communication and control systems with multi-receiving stations, it is a usual practice to utilize common circuits or carrier frequencies for all stations and to assign distinctive call signals for each station. In a conventional system the call signal, much like the local dial telephone numbers, is represented by different permutations of a group of integers such as 2 through 10. Typically, a call signal is formed by taking five integers at a time such as 5–3–2–7–4 to permit a very large number of stations to be selectively operated in the same network.

In prior art systems of this type, each mobile station would call a "central" station and request the "central" station to radiate the pulse code number of another mobile system with which it is desired to establish communication. In addition, it was necessary for the transmitting station to inform the operator of his call number for billing purposes. The proposed invention provides apparatus for automatically transmitting the assigned call number of the transmitting station at the start and end of the call so that proper billing may be accomplished without the services of a telephone company operator. This is accomplished by connecting tone generating means to the audio input of the transmitter prior to and at the conclusion of the message signal. The tone generating means generates an audio output signal which shifts from 1100 c.p.s. to 1500 c.p.s. and back to 1100 c.p.s. at a predetermined rate in accordance with its input. The input to the tone generating means is provided by clock generating means. The output of the clock generating means is also fed back through clock control means whereby the clock generating means generates a pulse train corresponding to the station's call number.

The advantages of the present invention will become more apparent from the following specification taken in connection with the accompanying drawings wherein like reference numerals refer to like parts and wherein FIGURE 1 is a block diagram of the station identification apparatus;

Figure 1:
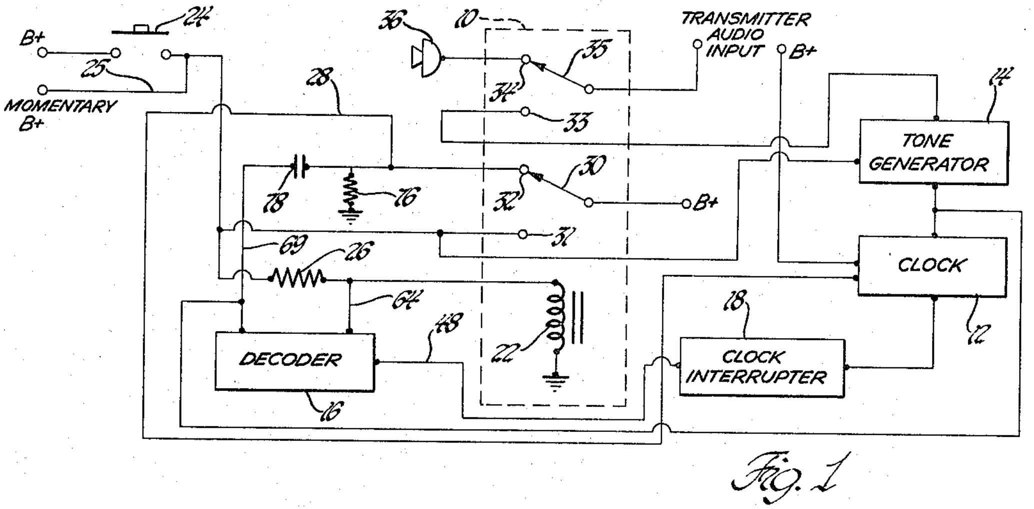

Referring now to FIGURE 1, there is shown an illustrative embodiment of the invention adapted to be used in combination with a transmitter for transmitting the station call number prior to and at the conclusion of the message. The signal identification apparatus comprises a relay 10, a clock generator 12, a tone generator 14, a decoder 16, a clock interrupter 18. The relay 10 comprises a relay coil 22, relay armatures 30 and 35, and relay contacts 31–34. One side of the relay coil 22 is connected through an initiate switch 24 and a current limiting resistor 26 to B+ while the other side of the relay coil is grounded. The armature 30 connects B+ to either the clock generator 12 through contact 32 or to the tone generator 14 through a contact 31. The armature 35 connects the transmitter audio input to the microphone 36 through contact 34 or to the tone generator output through contact 33. The clock generator 12 may be a conventional blocking oscillator which is inhibited by B+ connected through the relay armature 30, contact 32, and lead 28 when the relay 10 is in the de-energized state. The output of the clock generator 12 is applied to the input of the tone generator 14 and the decoder 16. The tone generator 14 comprises a bi-stable switch which controls the output of 1100 c.p.s. and 1500 c.p.s. oscillators so that there is a change in the frequency of the tone at the output of the tone generator with each trigger pulse from the clock generator.

Figure 2:
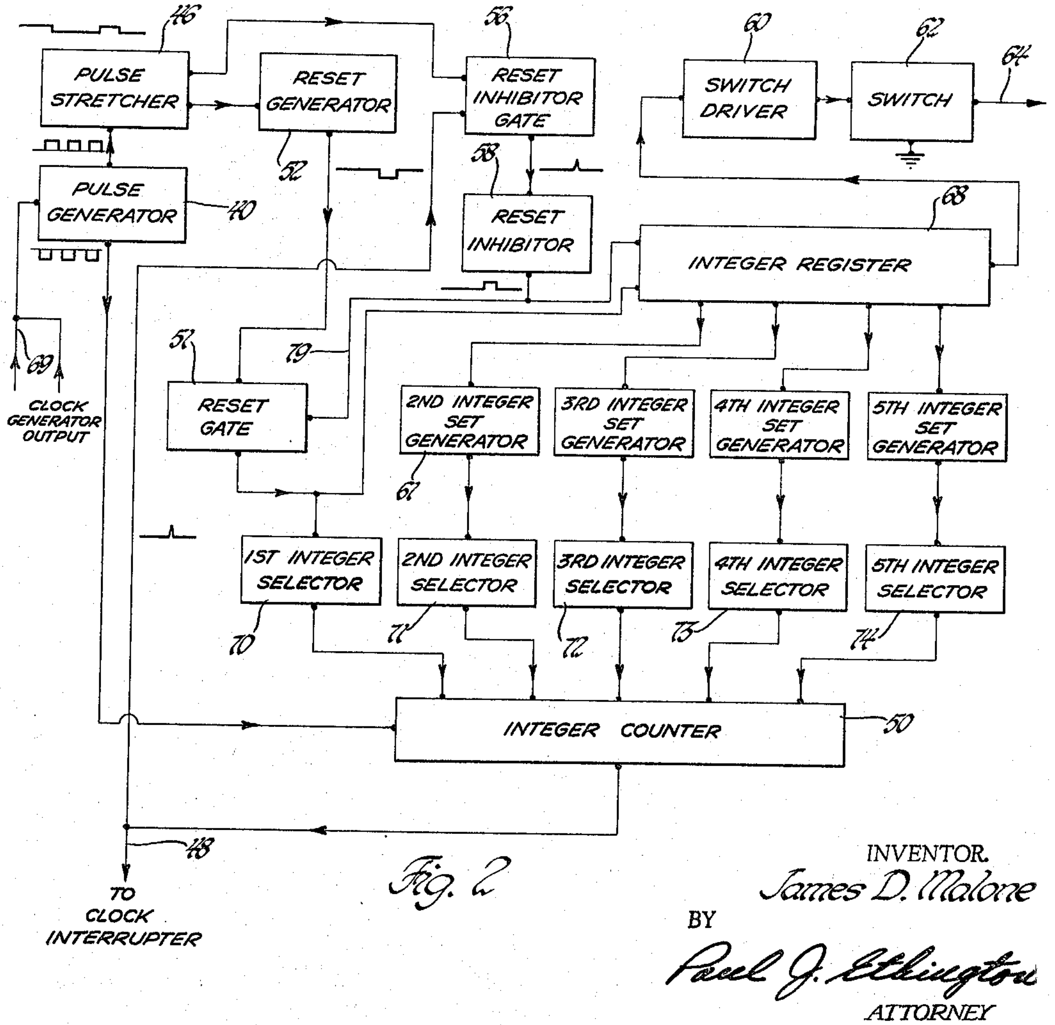
FIGURE 2 is a block diagram of the clock control means.

The decoder 16 may be more clearly understood by reference to FIGURE 2 and comprises a pulse generator 40, a pulse stretcher 46, a reset circuit, an integer counter 50, an integer register 68, and associated circuitry. The output of the clock generator 12 is applied to the pulse generator 40 which develops both positive and negative output pulses of approximately 30 milliseconds duration. The positive pulse operates the pulse stretcher circuit 46 and the positive-going trailing edge of the negative pulse triggers the integer counter 50. The pulse stretcher 46 produces a negative output pulse which lasts as long as there is a positive input pulse from the pulse generator 40. The output pulse from the pulse stretcher 46 is applied to the reset generator 52. If the input of the pulse generator 40 is interrupted, the trailing edge of the pulse stretcher output pulse, which is positive-going, triggers the reset generator 52 which produces an output pulse of about 30 milliseconds and is fed to the reset gate 51.

The integer counter 50 is a conventional binary counter. The counter 50 will develop a negative signal at its output when the counter is in the "0" state. At all other times, a positive output signal is produced. The pre-setting of the integer counter is accomplished by the integer selectors 70 through 74, one being provided for each integer of the call number. Each selector is connected to the integer counter 50 and is effective to set the counter to the predetermined integer.

For description purposes, I prefer to consider the binary number "1111" as the decimal integer "−1," "1110," as "−2," etc. When it is desired to signify the receipt of a train of pulses from the pulse generator 40, corresponding to a predetermined integer, by a final state of "0," it is necessary to pre-set the counter to a state which corresponds to "0" minus the predetermined number. Assuming that the call signal is 5–3–2–7–4, the counter would be set for "−5" or "1011" then as the five pulses are received, the counter is stepped through the states, "1100," "1101," "1110," "1111," and finally "0000."

The output signal of the integer counter 50 is fed to the reset inhibitor gate 56 and also to the clock interrupter 18. The pulses from the pulse stretcher 46 are also applied to the reset inhibitor gate 56 which will produce an output pulse, upon receipt of a negative input signal from the integer counter 50, which is stretched into a pulse of about 60 milliseconds duration by the reset inhibitor 58. The pulse from the reset inhibitor 58 is applied to the reset gate 51 which is thereby closed to prevent a reset signal from passing therethrough.

The output of the reset inhibitor is also applied to the integer register 68. The register 68 is a binary counter and is initially set for a state of "0." When the pulse from the reset inhibitor 58 reaches the integer register, the second integer set generator 61 is actuated and serves to energize the second integer selector 71 which resets the integer counter for the second integer call number which in this case is "3." This series of events occurs for each integer of the call number. When the last integer of the call number has been encoded, the register 68 will energize a switch driver 60 to actuate a switch 62 and ground the lead 64. The decoder circuitry described above is more fully explained in a co-pending application to Malone Serial No. 158,709 filed December 12, 1961, now Patent No. 3,226,679, and assigned to the assignee of this invention.

Figure 3:
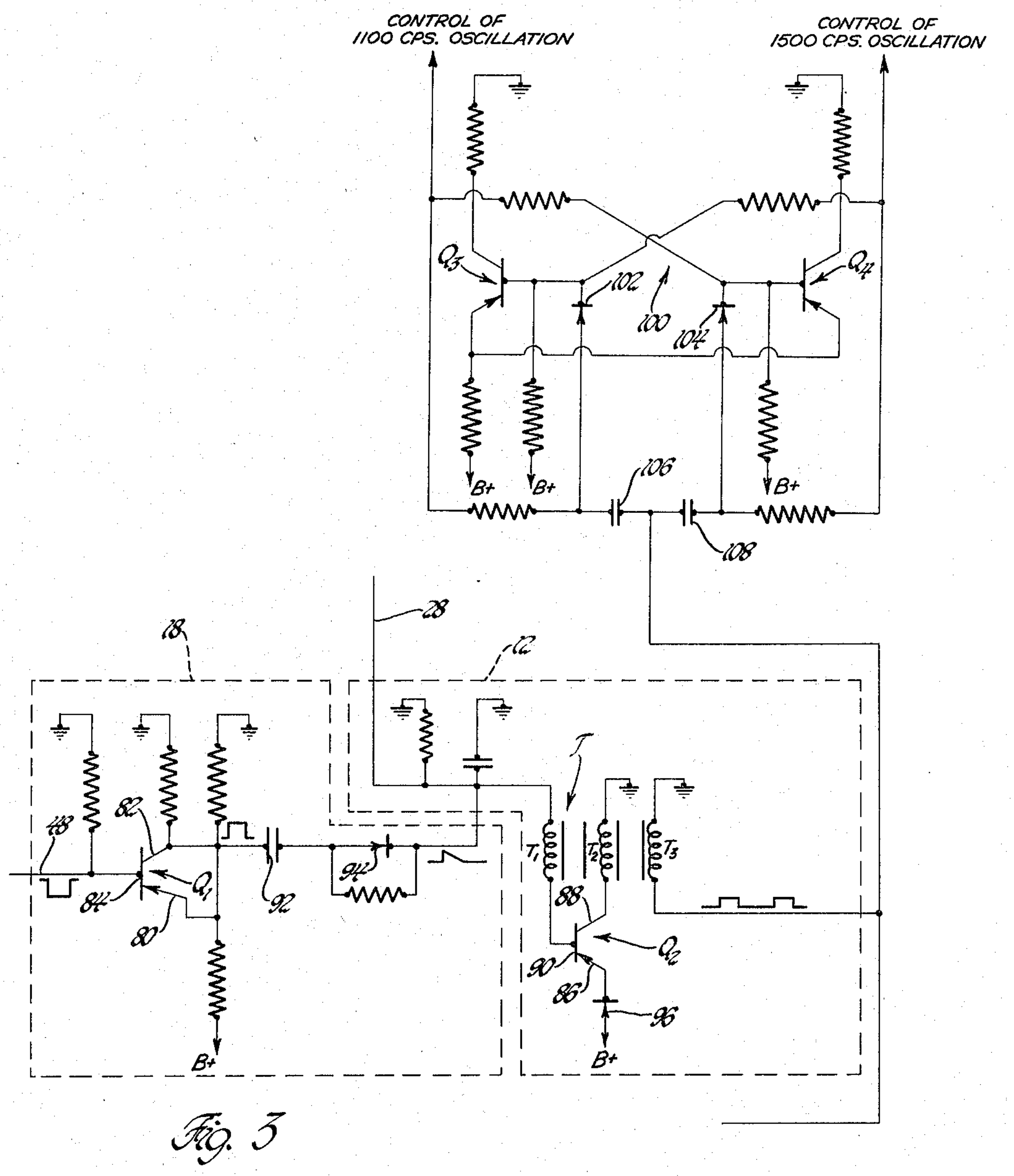
FIGURE 3 is a schematic diagram of a portion of the station identification apparatus.

Referring now to FIGURE 3, there is shown an illustrative embodiment of the clock interrupter 18, clock generator 12, and the bi-stable switch 100 which controls the tone generator 14. All transistors shown are of the PNP type, but it will be apparent the NPN type transistors may be used. The clock interrupter 18 comprises a transistor Q1 having an emitter electrode 80, a collector electrode 82, and a base electrode 84. The clock generator 12 is a conventional blocking oscillator and comprises a transistor Q2 having an emitter electrode 86, a collector electrode 88, and a base electrode 90. The emitter electrode 80 of transistor Q1 is connected to B+ and the collector electrode 82 is connected to the base electrode 90 of transistor Q2 through a capacitor 92, diode 94, lead 28, and the winding T1 of transformer T. The base electrode 84 of transistor Q1 is connected to the lead 48 which is connected to the output of the integer counter 50. The emitter electrode 86 of transistor Q2 is connected to B+ through a diode 96. The collector electrode 88 of transistor Q2 is connected to ground through winding T2 of transformer T. The winding T3 of transformer T is connected to the input of the bi-stable switch which controls the tone generator 14. The bi-stable switch 100 comprises transistors Q3 and Q4. The switch is a conventional bi-stable multivibrator with positive pulse steering diodes 102 and 104.

In operation a negative input signal from the integer counter 50 to the base 84 of transistor Q1 will cause transistor Q1 to conduct causing a positive potential to be applied to the base 90 of Q2 thereby disabling Q2. If a positive pulse is applied to the base 84 of Q1, a pulsating output from Q2 will be applied to the bi-stable switch 100. Assuming that Q3 is initially "on," the positive pulse applied to capacitors 106 and 108 will cause the diode 102 to be forward biased while diode 104 is reversed biased. The positive pulse is therefore applied through diode 102 to the base of Q3 driving it "off." The reverse bias on diode 104 prevents the trigger pulses from being applied to the base of Q4. Once the circuit switches states, the bias conditions of the diodes are reversed and a second positive trigger pulse is directed through forward biased diode 104 to the base of transistor Q4. The outputs of transistors Q3 and Q4 control 1100 c.p.s. and 1500 c.p.s. oscillators, respectively, so that there is a change in the frequency of the tone in the output of the tone generators with each trigger pulse from the clock generator.

In summary, the operation of the station identification apparatus is as follows. When the transmitting station desires to place a call, the operator will press the initiate switch 24 which energizes the relay 10 and enables the clock generator 12. Upon the energization of the relay coil 22, the armatures 30 and 35 are pulled down to connect B+ with the contact 31 and connect the output of the tone generator 14 to the transmitter audio input through the contact 33. With B+ disconnected from the lead 28, the clock generator 12 will be enabled and will produce a square wave output. The output of the clock generator 12 is applied to the bi-stable switch of the tone generator 14 to alternately energize the 1100 c.p.s. and 1500 c.p.s. oscillators. The output of the clock generator is also applied to the decoder 16 and when a number of pulses have been received at the pulse generator 40 corresponding to the first integer, a negative output signal is generated from the integer counter 50 and is applied through the lead 48 to the clock interrupter to apply a positive voltage to the clock generator 12 thereby inhibiting its operation momentarily. This interruption causes the output of the pulse generator 40 to disappear momentarily thereby initiating the positive-going trailing edge of the pulse stretcher output pulse as mentioned above. At this time, the integer counter 50 is pre-set for the second integer, allowing a positive output pulse from the integer counter, and the clock generator is again enabled. The cycle is repeated successively until all integers of the call number have been transmitted. When the fifth integer has been transmitted, the integer register 68 will energize the switch driver 60 thereby activating the switch 62 which grounds the lead 64 to shunt the relay coil 22 and de-energize the relay 10 which disables the clock generator 12 and connects the transmitter audio input lead to the microphone 36 through the armature 35 and contact 34. When the relay 10 is de-energized, the RC network comprising resistor 76 and capacitor 78 generates a reset pulse through the lead 69 to the pulse generator 40, pulse stretcher 46, reset generator 52, and reset gate 51, which will be open due to the positive input to the reset inhibitor gate 56 from the integer counter 50 and will return the integer register 68 to the "O" state via the lead 79 and will reset the integer counter 50 to the first integer of the call number via the first digit selector 70.

After the message has been transmitted and the operator replaces the hand set on the hook, a momentary B+ is applied to the relay 10 through the lead 25 to re-transmit the call number in the same manner as outlined above.

The above description is given for illustrated purposes only and the scope of the invention is intended to be limited only by the following claim.

I claim:

In a selective signaling system using call signals represented by permutations of integers and including a transmitter for transmitting a message signal and station identification apparatus for supplying an audio signal to the audio input of said transmitter corresponding to an assigned call signal prior to and at the conclusion of the message signal, said apparatus comprising a tone generator and a clock generator, switching means for connecting the output of said tone generator to the input of said transmitter and for energizing said clock generator whereby a pulsating output of a predetermined frequency is developed, a decoder responsive to said pulsating output for producing a control signal upon receipt of a number of pulses corresponding to each successive integer of said call signal, a clock interrupter responsive to said control signal for momentarily interrupting said clock generator, said switching means responsive to the receipt of said groups of pulses by said decoder for disabling said clock generator whereby a pulse train corresponding to said call signal is developed at the output of said pulse generator, said tone generator responsive to said pulse train for developing an audio signal corresponding to said pulse train and additional switching means for momentarily energizing said clock generator at the completion of said message signal for re-transmitting said call number.

References Cited by the Examiner

UNITED STATES PATENTS

| | | | |
|---|---|---|---|
| 3,080,547 | 3/1963 | Cooper | 179—84 |
| 3,175,191 | 3/1965 | Cohn et al. | 179—84 |

KATHLEEN H. CLAFFY, *Primary Examiner.*

H. ZELLER, *Assistant Examiner.*